March 9, 1926.
C. C. FARMER
1,575,747
SPEED GOVERNOR DEVICE
Filed Feb. 25, 1922
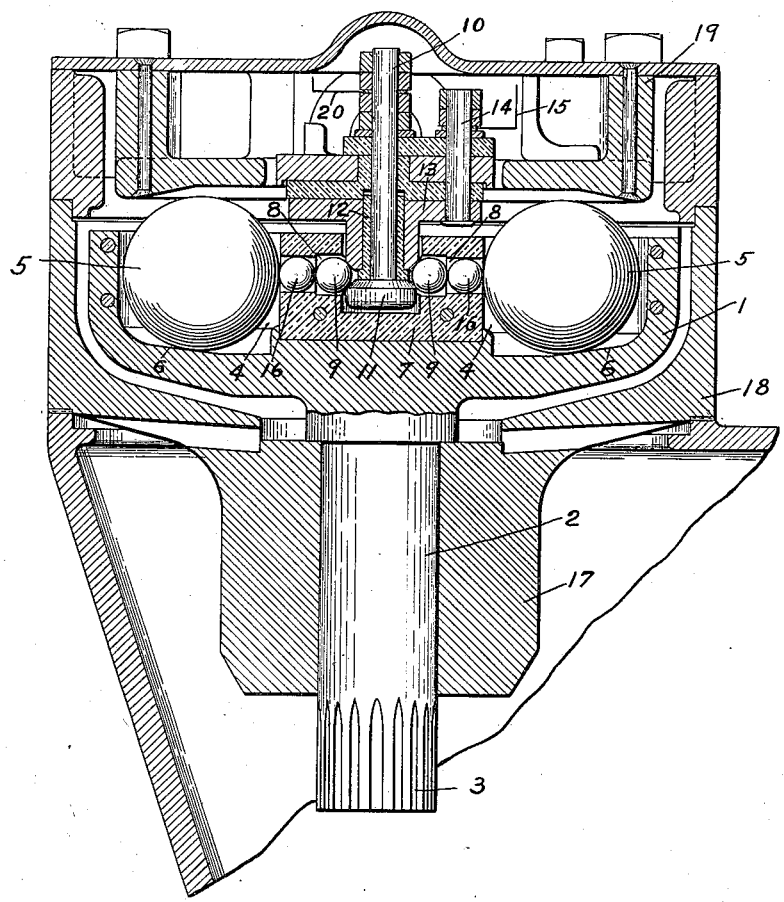
INVENTOR
CLYDE C. FARMER
BY Wm. M. Cady
ATTORNEY Patented Mar. 9, 1926.

1,575,747

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPEED-GOVERNOR DEVICE.

Application filed February 25, 1922. Serial No. 539,286.

*To all whom it may concern:*

Be it known that I, CLYDE C. FARMER, a citizen of the United States, residing at Pittsburgh, in the county of Allegheny and State of Pennsylvania, have invented new and useful Improvements in Speed-Governor Devices, of which the following is a specification.

This invention relates to a speed controlled governor more particularly adapted to open and close an electric circuit according to the speed of the governor.

The principal object of the invention is to provide a speed governor having slight frictional resistance to movement, so that the governor is correspondingly sensitive to variations in speed.

Other objects and advantages will appear in the following more detailed description of the invention.

In the accompanying drawing, the single figure is a central sectional view of a speed controlled governor device embodying my invention.

As shown in the drawing, the governor device may comprise a ball receptacle or casing 1 having a stem 2 carrying a pinion 3 by which the casing may be rotated at a speed proportional to the speed of a driving member, such as the driving axle of a locomotive.

Within the casing 1 are radially opposed pockets 4, each containing a governor ball 5, the floor 6 of each pocket being slightly inclined toward the axis of the governor, so that at a certain critical rotative speed, the balls will roll on the floors by gravity toward the axis of the governor.

At the axis of the casing, a block 7 of insulation is secured to the casing and is provided with opposite recesses 8 in line with the governor balls 5. Near the axis, the recesses 8 are of enlarged diameter and each contains a relatively small contact ball 9. Axially of the block of insulation 7 is mounted a contact bolt 10 having a head 11 adjacent to the balls 9 with a conical contact face adapted to be engaged by the balls 9.

Separated from the contact bolt 10 by a sleeve 12 of insulation, is a contact sleeve 13 having a conical contact face adapted to be engaged by the balls 9, the sleeve 13 being connected to a post 14 which in turn is connected to a circuit wire 15, and the bolt 10 being connected to a circuit wire 20.

Engaging each contact ball 9 is a ball 16 of insulation, the balls 16 being for the purpose of transmitting gravitational movement of the governor balls 5 to the contact balls 9.

The ball carrying cage 1 is mounted to rotate in a bearing 17, formed as a part of a casing 18 which encloses the cage 1 and the contact posts 10 and 14 are mounted in a cover plate 19 which is secured to the casing 18.

In operation, when the spindle 2 is rotated at a speed above a predetermined degree, the balls 5 are thrown out by centrifugal force and the contact balls 9 are free to drop down by gravity into the enlarged portions of the recesses 8, thus opening the circuit connected to the wires 15 and 20. When the speed of rotation of the cage 1 is reduced below a predetermined low degree, the balls 5 will roll down the inclines 6 by gravity toward the axis of the governor and engaging the balls 16 of insulation, will cause movement of the balls 16 and thereby the contact balls 9 toward the axis of the governor. The balls 9 are then caused to assume the contact positions as shown in the drawing, in which the circuit is closed from the bolt head 11 through the contact balls 9 to the sleeve 13.

A governor constructed in accordance with my invention is capable of operating through a great range of rotative speeds and is very responsive to changes in speed, since the friction resistance is reduced to a minimum.

It will also be noted that the governor is especially adapted to operate on moving vehicles, such as railway cars or locomotives, where the vehicle may at times be out of vertical alinement, as on superelevated curves, since at low speeds, where the governor balls should close the electric circuit, if the vehicle happens to be off center, one or the other of the governor balls will always be in position to close the circuit due to the tendency of one ball to gravitate toward the governor axis when the other governor ball tends to gravitate away from the governor axis.

Having now described my invention, what I claim as new and desire to secure by Letters Patent, is:—

1. A speed governor comprising a rotatable casing having inclined ways, governor balls disposed on said ways and thereby capable of gravitating toward the axis of the governor as the rotative speed of the governor is reduced, and movable contact members operated by said governor balls upon gravitational movement for closing an electric circuit.

2. A speed governor comprising a rotatable casing, governor balls mounted in said casing and capable of gravitating toward the axis of the governor as the rotative speed of the governor is reduced, and a contact ball operated upon movement of a governor ball toward the axis of the governor for closing an electric circuit.

3. A speed governor comprising a rotatable casing, governor balls mounted to rotate with said casing, contact members mounted axially of the casing, and a contact ball operable by a governor ball upon movement of the governor ball toward the axis of the governor for connecting said contact members.

4. A speed governor comprising a rotatable casing, governor balls mounted to rotate with said casing, a contact ball for controlling an electric circuit, and a ball of insulation interposed between the contact ball and a governor ball for transmitting movement of the governor ball to the contact ball.

In testimony whereof I have hereunto set my hand.

CLYDE C. FARMER.